US011181319B2

(12) United States Patent
Neumann Roeschmann

(10) Patent No.: US 11,181,319 B2
(45) Date of Patent: Nov. 23, 2021

(54) SAWED WOOD DRYING SYSTEM WITH SECONDARY AIR CIRCULATION

(71) Applicant: NEUMANN S.A., Talcahuano (CL)

(72) Inventor: Rodolfo Jorge Neumann Roeschmann, Talcahuano (CL)

(73) Assignee: NEUMANN S.A., Talcahuano (CL)

( * ) Notice: Subject to any disclaimer, the term of this patent is extended or adjusted under 35 U.S.C. 154(b) by 38 days.

(21) Appl. No.: 16/737,996

(22) Filed: Jan. 9, 2020

(65) Prior Publication Data

US 2020/0326126 A1 Oct. 15, 2020

(51) Int. Cl.
F26B 21/04 (2006.01)
F26B 23/00 (2006.01)
F26B 3/04 (2006.01)

(52) U.S. Cl.
CPC ............. *F26B 21/04* (2013.01); *F26B 3/04* (2013.01); *F26B 23/007* (2013.01); *F26B 2210/16* (2013.01)

(58) Field of Classification Search
CPC .......... F26B 21/04; F26B 3/04; F26B 23/007; F26B 2210/16
USPC .......................................................... 34/219
See application file for complete search history.

(56) References Cited

U.S. PATENT DOCUMENTS

| 3,986,268 | A | * | 10/1976 | Koppelman | .............. | F26B 7/00 |
| | | | | | | 34/257 |
| 7,146,747 | B2 | * | 12/2006 | Studd | ...................... | F26B 15/12 |
| | | | | | | 34/396 |
| 7,194,822 | B2 | * | 3/2007 | Kolari | ................... | F26B 23/002 |
| | | | | | | 34/489 |
| 7,963,048 | B2 | * | 6/2011 | Pollard | ................... | F26B 15/12 |
| | | | | | | 34/396 |
| 8,397,400 | B2 | * | 3/2013 | Choo | ........................ | F26B 9/06 |
| | | | | | | 34/396 |
| 9,200,834 | B1 | | 12/2015 | Ball, Jr. et al. | | |
| 9,423,176 | B1 | | 8/2016 | Girardi | | |
| 9,500,408 | B2 | * | 11/2016 | Spangler | ................ | F26B 15/12 |
| 9,651,308 | B1 | * | 5/2017 | Lewis | .................... | F26B 21/086 |
| 9,874,397 | B1 | | 1/2018 | Ball, Jr. et al. | | |
| 9,964,359 | B2 | | 5/2018 | Blomquist | | |
| 10,082,335 | B2 | * | 9/2018 | Kolari | ....................... | F26B 9/06 |
| 10,161,678 | B2 | * | 12/2018 | Blomquist | ............. | F26B 15/04 |
| 10,619,921 | B2 | * | 4/2020 | Brodie | ................... | F26B 21/04 |

(Continued)

FOREIGN PATENT DOCUMENTS

| WO | WO-2017072631 A1 | * | 5/2017 | ............. | F26B 21/02 |
| WO | WO-2019147454 A1 | * | 8/2019 | ............... | F26B 3/04 |

*Primary Examiner* — Stephen M Gravini
(74) *Attorney, Agent, or Firm* — Hoglund & Pamias, PSC; Roberto J. Rios

(57) ABSTRACT

A sawn wood drying system, which allows to take advantage of the heat contained in the dry wood that leaves the system to preheat the wet and cold wood that enters the system, the system comprising: a heating chamber, a drying chamber and a cooling chamber, sequentially arranged, and a transport path that allows the transfer of sawn wood through these three chambers; a first air circulation system, which provides a first high temperature air flow inside the drying chamber; and a second air circulation system that provides a second air flow, independent of the first air flow, which allows the heating chamber to be in fluid communication with the cooling chamber by means of external chambers or ducts connecting both chambers.

16 Claims, 2 Drawing Sheets

(56) References Cited

U.S. PATENT DOCUMENTS

| | | | |
|---|---|---|---|
| 10,663,227 B2 * | 5/2020 | Roeschmann | F26B 21/004 |
| RE48,227 E * | 9/2020 | Ball, Jr. | F26B 15/14 |
| 10,969,172 B2 * | 4/2021 | Blomquist | F26B 15/00 |
| 2018/0087838 A1 | 3/2018 | Kolari | |
| 2020/0326126 A1 * | 10/2020 | Roeschmann | F26B 23/007 |

* cited by examiner

SAWED WOOD DRYING SYSTEM WITH SECONDARY AIR CIRCULATION

FIELD OF THE INVENTION

The invention relates to artificial wood drying and the efficient use of energy. Particularly, the invention relates to a drying kiln for the processing of sawn wood, which allows to take advantage of the heat contained in the dry wood to preheat the green wood that enters the dryer. This system also allows the hot wood to be cooled efficiently before being conditioned, especially in processes at temperatures above 90° C.

BACKGROUND OF THE INVENTION

Many uses require the wood to be stabilized dimensionally before being transformed to the form of its final use, which can be a piece of furniture, a component of a house, a musical instrument, etc. For this purpose, it is necessary to dry the wood, preferably in drying kilns with controlled environmental conditions, which avoids or minimizes the appearance of internal stresses and cracks, stains, unwanted color changes and other drying defects.

Artificial drying of sawn wood has been constantly studied and optimized for more than 100 years. To extract the water contained in their cavities and cell walls, mostly drying chambers are used, in which hot air is recirculated through piles of boards separated by sticks. The air is driven by fans through the wood piles, delivering the heat to the wood and receiving moisture from it in an adiabatic process. The initial condition of the air recirculated at the inlet of the piles is controlled and restored, heating the piles and renewing part the air with external air entering through vents specially designed for this purpose.

In recent years, research and development efforts have mainly focused on meeting the following objectives:
  Reducing drying times by applying more efficient drying schedules.
  Reducing thermal and electrical energy consumption.
  Stabilizing the load of the boiler by reducing the maximum and minimum thermal consumption.
  Improving process control and particularly the determination of the final moisture content of the wood.
  Improving the versatility of dryers to process wood of different thicknesses.

The tendency during the last years has been to encourage the use of continuous dryers, but none of the patent applications filed fulfill all the objectives, except the one disclosed herein.

An example of the above is disclosed in patent document U.S. Pat. No. 7,146,747 B2, which describes a continuous or progressive drying kiln with different zones having different functions or thermal loads. Typically, in the first zone(s) the wood is heated, in the next zone(s) it dries with different environmental conditions and in the last zone(s) the wood is conditioned to release drying stresses. Although with this the design the ventilation, heating and air renewal systems of each zone can be optimized and different drying schedules can be used, preferably of high temperature, with this configuration the heat contained in the dried wood is not exploited.

The patent document U.S. Pat. No. 7,963,048 B2 describes a continuous drying kiln with two ways, through which vehicles with wood piles advance in opposite directions, in one way the wood enters at a first end and the other way the wood enters at the opposite end. In all compartments the air is recirculated through the wood stacked in both sets of vehicles. The idea is that at each end of the drying kiln the wood entering the kiln is heated with the wood coming out, thereby achieving a good conditioning and cooling of the already dried wood. The problem with these drying kilns is that they are not sufficiently versatile and are difficult to control when the process is interrupted or when a change in the thicknesses and/or the type of wood is desired. In addition, this drying kiln does not have an embodiment with a single path of wood and wood must be loaded and unloaded at both ends of the kiln, increasing the cost of loading, which is significant.

Patent documents U.S. Pat. Nos. 9,200,834, 9,423,176, and 9,874,397 describe very similar drying kilns, in which the direction of the air flow is not reversed periodically according to an elapsed time, as used in most of commercial dryers, but the flow is reversed when timber is moved from one section to another. Thus, the fans in each compartment rotate in a single direction and can have blades constructed or arranged in a more efficient way. In theory this is reasonable, but control is difficult and drying times generally increase. Additionally, a heat recovery system is described that takes advantage of the non-reversibility of the fans to preheat the fresh cold air with the heat of the moisture expelled from the dryer.

The publication of the patent application US 2018/0087838 A1 describes a sawn wood drying kiln, consisting of a preheating chamber, a drying chamber and a conditioning chamber. The preheating chamber has a condensate collection system and is connected to the first drying chamber, the conditioning chamber has a spray system that humidifies the recirculated air with the condensate collected in the first chamber and which is also connected to the last drying chamber. Depending on the stage of the process, the hot vapors of the central drying chamber are passed to the first heating zone or to the last conditioning zone. This takes advantage of the heat of the vapors to preheat the wood that is entering the kiln, but the heat contained in the dry wood that is coming out is not used.

Patent document U.S. Pat. No. 9,964,359 B2 describes a sawn wood drying kiln that allows multiple ways of circulating wood piles inside the kiln, as well as multiple ways to circulate the air. The drying kiln described allows only a partial heat recovery and is difficult to operate and control.

As can be seen from the cited documents, in none of the systems described, or in any one-way drying kiln in the prior art, the heat contained in the hot wood is efficiently used without compromising the versatility and operation of the kiln.

SUMMARY OF THE INVENTION

In this patent application a preferably continuous drying kiln is disclosed, in which the wood is heated, dried, conditioned and cooled in different chambers, as usual in continuous or progressive drying kilns.

As shown in FIG. 1, a typical progressive drying kiln of the prior art comprises a heating zone (110), a drying zone (120) and a cooling and conditioning zone (130). In this case, all zones have upper fans (160), while heaters (170) are usually arranged mainly in the drying zone. Unlike the prior art drying systems, in the new type of drying kiln of the present application there are two independent air circulation paths driven by different fans (see FIG. 2). In the central chamber one or more fans circulate hot air to dry the wood, driving the air in the form of a vertical circle, typically with large fans located above the piles, while in the side chambers one or more fans circulate air between a zone in which the cold wood enters the kiln and a zone in which the hot wood comes out from the kiln, in a mainly horizontal flow. This secondary air flow between both ends of the kiln is performed by two side external compartments, superimposed on the drying zone.

In a process with final drying temperatures exceeding around 90° C. it is desirable to cool the wood before conditioning. This is achieved by transferring the excess of heat stored in the already dried wood, which passes to the cooling zone and to the cold wood entering the kiln. Once the dry wood has cooled to a temperature typically below 90° C., the secondary air flow is humidified with external means to achieve a good conditioning. Subsequently, the characteristics of the secondary air flow can be maintained according to the final equilibrium humidity that is desired in the drying process.

Applying each of the techniques indicated, the new type of drying kiln disclosed herein minimizes the energy consumption required, optimizes the conditioning of the wood and ensures that the wood will have the desired final humidity.

DETAILED DESCRIPTION OF THE INVENTION

Figure 1:
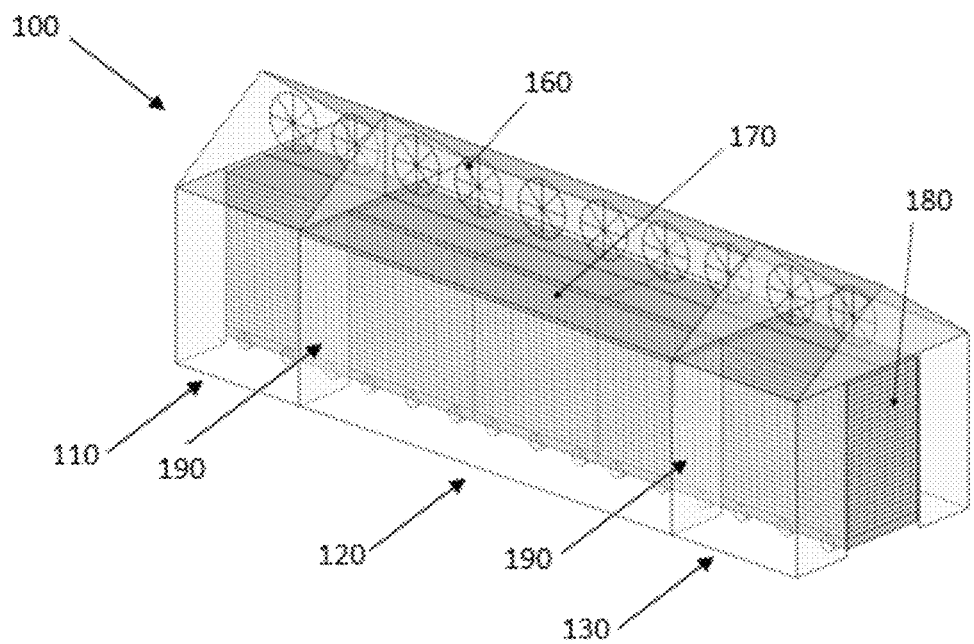
FIG. 1 shows a schematic representation of a progressive drying kiln of the prior art.
Figure 2:
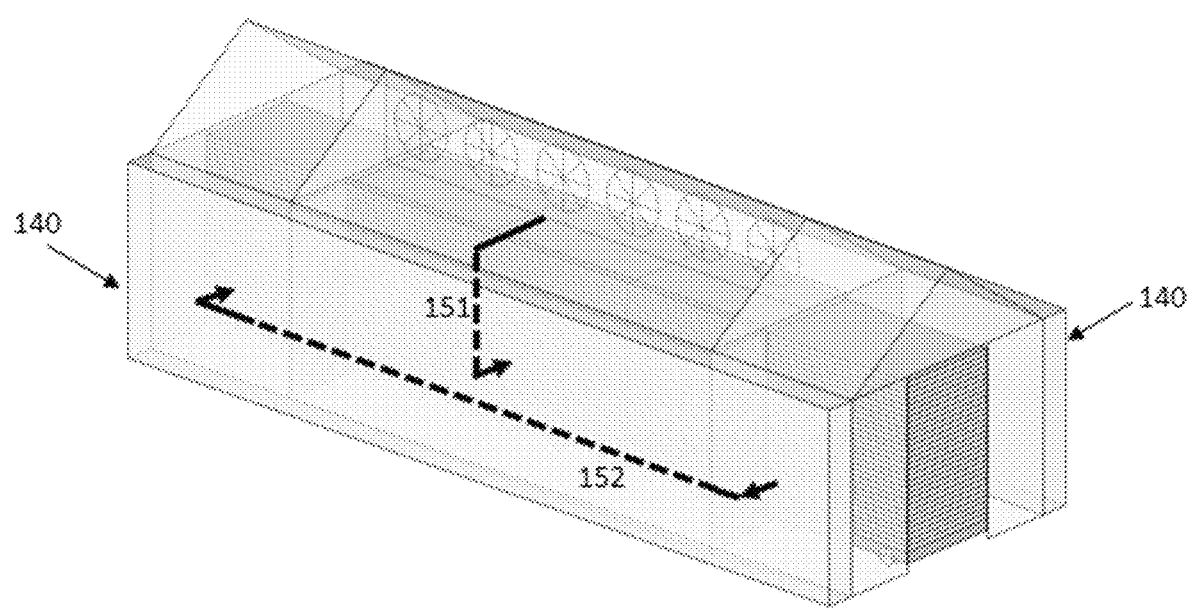
FIG. 2 shows a schematic representation of a first embodiment of the drying kiln of the present application.
Figure 3:
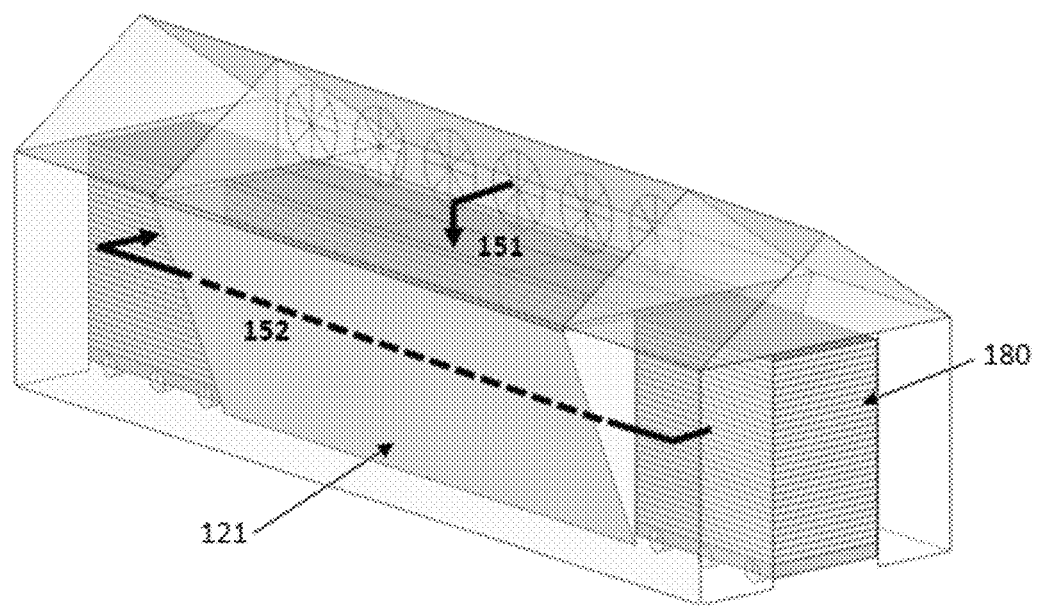
FIG. 3 shows a schematic representation of a second embodiment of the drying kiln of the present application.
Figure 4:
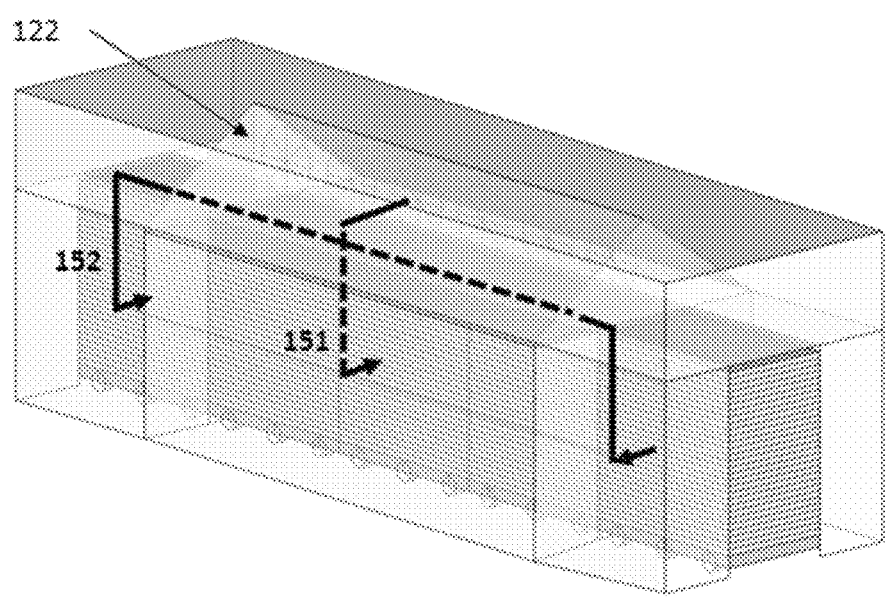
FIG. 4 shows a schematic representation of a third embodiment of the drying kiln of the present application.

As can be seen in FIGS. 2 to 4, the invention relates to a wood drying system (100) that allows to take advantage of the heat contained in the hot wood leaving the system to optimally preheat the wood entering the drying kiln, which comprises:
- a heating chamber (110), a drying chamber (120) and a cooling chamber (130), arranged successively, which may each consist of one or more sections, and a transport path that allows sawn timber transfer (180) through these three chambers;
- a first (vertical) air circulation system that provides a first flow of hot air (151) inside the drying chamber; and
- a second (horizontal) air circulation system that provides a second air flow (152), independent of the first flow, which a fluid communication between the heating chamber and the cooling chamber via side chambers or ducts (140) that connect both chambers.

In this way, the drying system of the invention corresponds to a progressive or continuous system, where the wood is moved in single direction, from a wet wood inlet to a dry wood outlet. Thus, the heating chamber is located at the inlet end, followed by the drying chamber and, subsequently, the cooling chamber is located at the outlet end of the drying system.

In optional embodiments of the invention, each of the chambers can include one or several sections, independent or communicated with each other. In addition, the second circulation system can include one or more air flows, which are flows between the one or more sections of the heating and/or cooling chambers by means of ducts arranged on one or both sides of the drying system, side by side, overlaid or in combinations of these possible locations.

The heating and cooling chambers (110, 130) are communicated such to allow the circulation of the secondary air flow (152) of the second circulation system, which is driven by one or more fans located anywhere in said ducts or chambers, either at the entrance or at the exit of the same. In all embodiments there are spaces or ducts (140) that allow the circulation of the secondary air in both directions, as shown in FIGS. 2 to 4, and allow the return of the air heated by the wood that leaves the system to the inlet end of the system.

As shown in FIGS. 1 to 4, the three chambers of the system, of heating (110), drying (120) and cooling (130), are separated from each other by separation walls (190), which allow the operation of both air circulation systems independently. Thus, as shown in FIG. 2, one or more fans are arranged inside the drying chamber for the creation of a first air flow (151) inside the chamber, while the second flow of air flows through two external chambers or ducts (140), located adjacent to the side walls of the drying system, symmetrically on its opposite sides.

In alternative embodiments of the invention, it may be convenient to reduce the space of the first air circulation system in the drying chamber(s). As shown by way of example in FIG. 3, this reduction of space can be carried out by means of an inclined wall (121) extending from the top of the drying chamber, in angle inward the chamber, to the bottom of the same. Preferably, the inclined walls extend approximately from the dropped ceiling or the level reached by the piles of wood (180), to approximately the bottom of the piles, thus separating the inclined vertical flow of the primary air (151) from the horizontal flow of secondary air (152). This configuration has the additional advantage that the primary air flow is improved, since the air speed tends to be kept constant against the wood piles, thereby improving the speed distribution in the heights and reducing the losses of load of circulated air.

In a preferred embodiment of the invention, in order to facilitate the circulation of people in the kiln, a hallway can be provided in the lower part of the external chambers (not shown in the figures), with dimensions suitable for the circulation of people, for example, approximately 400 mm wide.

Another alternative embodiment of the invention is described in FIG. 4, wherein the second air circulation system is arranged such that the secondary air flow (152) circulates through upper part of the kiln, communicating the heating and cooling chambers, above the drying chamber. In this embodiment, the drying chamber comprises in its upper part two inclined walls (122) that create sufficient space for the circulation of the second air flow, allowing fluid communication between the heating and cooling chambers.

Optionally, the embodiments described above can also be used in drying kilns with two paths for vehicles loaded with wood piles. Particularly, in case that an accelerated or high temperature drying process is provided, it may be convenient to use central heaters preferably located in the first drying zone.

Thus, by means of the invention it is possible to improve the deficiencies recognized in the known technologies of the state of the art, since due to the shape and arrangement of the different chambers that constitute the drying system, and especially to the shape and arrangement of the external chambers, it is possible a fluid communication between the heating and cooling chambers, without a considerable increase in energy consumption, allowing to take advantage of the heat contained in the hot wood that leaves the system to optimally preheat the wood that enters the kiln. It is also possible to optimize the conditioning of the wood and ensure that it will have the desired final humidity.

Finally, it should be noted that particular characteristics of the invention, such as dimensions, materials, and specific aspects of the preferred embodiments described above, may vary or be modified depending on the design requirements. Accordingly, the specific embodiments described above are not intended to be limiting, and such variations and/or modifications falls within the spirit and scope of the invention.

What is claimed is:

1. A sawn wood drying system, comprising:
   a heating chamber, a drying chamber and a cooling chamber, sequentially arranged, and a transport path that allows transfering sawn wood through the heating chamber, the drying chamber and the cooling chamber;
   a first air circulation system, which provides a first temperature air flow inside the drying chamber; and
   a second air circulation system, which provides a second air flow, independent of the first air flow, and allows the heating chamber to be in fluid communication with the cooling chamber through external chambers or ducts directly connecting said heating chamber and said cooling chamber.

2. The drying system of claim 1, wherein the second air circulation system comprises at least one fan that drives the second air flow, which are located on the external chambers or ducts, either in an entrance, an exit, or in a central part thereof.

3. The drying system of claim 2, wherein the heating, drying and cooling chambers are separated from each other by separation walls, which also allow operating said first and second air circulation systems independently.

4. The drying system of claim 3, wherein the external chambers or ducts are located adjacent to external side walls of the drying system, symmetrically, on opposite sides thereof.

5. The drying system of claim 4, wherein the drying chamber comprises inclined side walls extending from a top to a bottom of the drying chamber at an angle inside the drying chamber, reducing a space in the first air circulation system.

6. The drying system of claim 5, wherein the inclined side walls extend from a bottom of heaters to the bottom of the drying chamber.

7. The drying system of claim 5, wherein the inclined side walls extend from a level of a dropped ceiling or the level of a top of piles of wood, to a bottom of the piles of wood.

8. The drying system of claim 5, wherein a hallway is arranged in a lower part of the external chambers or ducts to facilitate circulation of people.

9. The drying system of claim 3, wherein the external chambers or ducts are arranged in an upper part of the drying system, thereby communicating the heating and cooling chambers above the drying chamber.

10. The drying system of claim 9, wherein the drying chamber comprises two inclined walls in an upper part of said drying chamber for circulating the second air flow, allowing a fluid communication between the heating and cooling chambers.

11. The drying system of claim 1, wherein each of the heating chamber, the drying chamber and the cooling chamber includes one section or a plurality sections separated or communicated with each other.

12. The drying system according to claim 1, further comprising two transport paths for the transport of vehicles loaded with wood piles, and one or more central heaters between both transport paths, arranged along an entire drying zone or in one or more sections thereof.

13. The drying system according to claim 1, wherein the drying system is a progressive or continuous type system, wherein the sawn wood is moved in only one direction, from an inlet end of wet wood to an outlet end of dry wood, and the heating chamber, the drying chamber and the cooling chamber include one or more sections controlled together or independently.

14. The drying system according to claim 1, wherein the second air flow is circulated between the heating and cooling chambers through ducts that are arranged on one or both sides of the drying system, side by side, overlaid or in combinations of these locations.

15. The drying system of claim 11, wherein the second air circulation system comprises at least one air flow, which flows between more than one of the sections of the heating chamber, the cooling chamber or a combination thereof, by ducts arranged on one or both sides of the drying system, side by side, overlaid or in combinations of these locations.

16. The drying system according to claim 1, wherein wet vapors leaving the drying chamber are evacuated outside at one or more locations of the second air circulation system.

* * * * *